United States Patent
Kato

(10) Patent No.: US 8,332,670 B2
(45) Date of Patent: Dec. 11, 2012

(54) METHOD AND APPARATUS FOR DISCOVERY AND DETECTION OF RELATIONSHIP BETWEEN DEVICE AND POWER DISTRIBUTION OUTLET

(75) Inventor: Hideharu Kato, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 470 days.

(21) Appl. No.: 12/565,061

(22) Filed: Sep. 23, 2009

(65) Prior Publication Data
US 2011/0072289 A1    Mar. 24, 2011

(51) Int. Cl.
G06F 1/00 (2006.01)
G06F 1/32 (2006.01)
(52) U.S. Cl. .......................... 713/310; 713/300; 713/320
(58) Field of Classification Search .................. 713/300, 713/310, 320, 324
See application file for complete search history.

(56) References Cited

U.S. PATENT DOCUMENTS

| | | | | |
|---|---|---|---|---|
| 5,752,050 A | * | 5/1998 | Hernandez et al. | 713/330 |
| 5,754,869 A | * | 5/1998 | Holzhammer et al. | 713/300 |
| 6,092,209 A | * | 7/2000 | Holzhammer et al. | 713/324 |
| 6,633,823 B2 | * | 10/2003 | Bartone et al. | 702/57 |
| 7,369,921 B2 | * | 5/2008 | Taliaferro | 700/286 |
| 7,624,287 B2 | * | 11/2009 | Khodorkovsky et al. | 713/300 |
| 7,863,779 B1 | * | 1/2011 | Pineda | 307/140 |
| 7,962,099 B2 | * | 6/2011 | Griffin | 455/63.1 |
| 2009/0234512 A1 | * | 9/2009 | Ewing et al. | 700/295 |
| 2010/0255779 A1 | * | 10/2010 | Lee et al. | 455/41.2 |

* cited by examiner

*Primary Examiner* — Suresh Suryawanshi
(74) *Attorney, Agent, or Firm* — Mattingly & Malur, P.C.

(57) ABSTRACT

For the discovery and detection of the relationships between power consuming devices and power distribution outlets, an aspect of the invention is directed to a system including at least one power consuming device and a plurality of outlets for supplying power, and a method for discovering a relationship between a target device of the at least one power consuming device and at least one outlet of the plurality of outlets which supplies power to the target device. The method comprises applying an external action to the target device to change power consumption of the target device; monitoring power consumption at each of the plurality of outlets; and correlating the applied external action and the monitored power consumption to obtain the relationship between the target device and the at least one outlet which supplies power to the target device.

20 Claims, 18 Drawing Sheets

| ID | Time | Event |
|---|---|---|
| 1 | 2009-08-11T15:46:00 | Started |
| 2 | 2009-08-11T15:46:00 | Server Phase (Device_ID = "Server_1") Started |
| 3 | 2009-08-11T15:46:00 | High Load Started |
| 4 | 2009-08-11T15:47:00 | Low Load Started |
| 5 | 2009-08-11T15:48:00 | High Load Started |
| 6 | 2009-08-11T15:50:00 | Low Load Started |
| . | . . . | . . . |
| 9 | 2009-08-11T15:52:00 | Server Phase (Device_ID = "Server_1") Finished |
| 10 | 2009-08-11T15:52:00 | SAN Phase M=1 (Device_ID =" Switch_1") Started |
| 11 | 2009-08-11T15:52:00 | High Load Started |
| 12 | 2009-08-11T15:53:00 | Low Load Started |
| . | . . . | . . . |
| 17 | 2009-08-11T15:56:00 | SAN Phase M=1 (Device_ID =" Switch_1") Finished |
| 18 | 2009-08-11T15:56:00 | SAN Phase M=2 (Device_ID =" Switch_2") Started |
| . | . . . | . . . |
| 24 | 2009-08-11T16:00:00 | SAN Phase M=2 (Device_ID =" Switch_2") Finished |
| . | . . . | . . . |
| 31 | 2009-08-11T16:04:00 | Finished |

FIG. 2

| ID | Time | PDU_ID | Outlet_ID | Power_Consumption |
|---|---|---|---|---|
| 1 | 2009-08-11T16:03:00 | PDU_1 | O_1 | 100 |
| 2 | 2009-08-11T16:03:00 | PDU_1 | O_2 | 80 |
| 3 | 2009-08-11T16:03:00 | PDU_1 | O_3 | 0 |
| 4 | 2009-08-11T16:03:00 | PDU_1 | O_4 | 0 |
| 5 | 2009-08-11T16:03:00 | PDU_1 | O_5 | 20 |
| 6 | 2009-08-11T16:03:00 | PDU_1 | O_6 | 230 |
| 7 | 2009-08-11T16:03:00 | PDU_1 | O_7 | 100 |
| 8 | 2009-08-11T16:03:00 | PDU_1 | O_8 | 20 |
| 9 | 2009-08-11T16:04:00 | PDU_1 | O_1 | 90 |
| 10 | 2009-08-11T16:04:00 | PDU_1 | O_2 | 10 |
| ... | ... | ... | ... | ... |

FIG. 3

|  401 | 402 | 403 | 404 | 400 |
| --- | --- | --- | --- | --- |
| PDU_ID | Outlet_ID | Device_ID | Registered_Time | |
| PDU_1 | O_1 | Server_1 | 2009-08-11T16:10:00 | |
| PDU_1 | O_2 | Server_2 | 2009-08-11T17:32:00 | |
| PDU_1 | O_3 | Switch_1 | 2009-08-11T16:10:00 | |
| PDU_1 | O_4 | Switch_2 | 2009-08-11T16:10:00 | |
| PDU_1 | O_5 | Storage_1 | 2009-08-11T16:10:00 | |
| PDU_1 | O_6 | null | null | |
| PDU_1 | O_7 | null | null | |
| PDU_1 | O_8 | null | null | |
| PDU_2 | O_1 | null | null | |
| PDU_2 | O_2 | Server_1 | 2009-08-11T16:10:00 | |
| PDU_2 | O_3 | Storage_1 | 2009-08-11T16:10:00 | |
| PDU_2 | O_4 | null | null | |
| PDU_2 | O_5 | null | null | |
| PDU_2 | O_6 | Switch_1 | 2009-08-11T16:10:00 | |
| PDU_2 | O_7 | Switch_2 | 2009-08-11T16:10:00 | |
| PDU_2 | O_8 | Server_2 | 2009-08-11T17:32:00 | |
| PDU_3 | ... | ... | ... | |
| ... | ... | ... | ... | |

*FIG. 4*

| Device_ID | Device_Type | Management_IF_Address | Outlet_Mapping |
|---|---|---|---|
| Server_1 | Server | ... | True |
| Server_2 | Server | ... | True |
| Switch_1 | Switch | ... | True |
| Storage_1 | Storage | ... | True |
| Storage_2 | Storage | ... | False |
| Server_3 | Server | ... | False |
| PDU_1 | PDU | ... | Null |
| PDU_2 | PDU | ... | Null |
| Switch_2 | Switch | ... | True |
| ... | ... | ... | ... |

FIG. 5

| ID | Server | Switch | Storage |
|---|---|---|---|
| | 601 | 602 | 603 | 604 |
| | Server | Switch | Storage |
| 1 | Server_1 | Switch_1 | Storage_1 |
| 2 | Server_1 | Switch_2 | Storage_1 |
| 3 | Server_2 | Switch_1 | Storage_1 |
| 4 | Server_2 | Switch_2 | Storage_1 |
| 5 | Server_3 | Switch_3 | Storage_2 |
| ... | ... | ... | ... |

| ID | Event_Type | Device_Type | Change_Type |
|---|---|---|---|
| 1 | Power Saving Mode On | Switch | DOWN |
| 2 | Power Saving Mode Off | Switch | UP |
| 3 | Spin Down (MAID) | Storage | DOWN |
| 4 | Spin Up (MAID) | Storage | UP |
| 5 | Host Power Off (Server Virtualization) | Server | DOWN |
| 6 | Host Power On (Server Virtualization) | Server | UP |
| 7 | Redundant Switch Power Off | Switch | DOWN |
| 8 | Redundant Switch Power On | Switch | UP |
| 9 | CPU Clock Capping On | Server | DOWN |
| 10 | CPU Clock Capping Off | Server | UP |
| ... | | | |

| ID | PDU_ID | Outlet_ID | Time | Change_Type |
|---|---|---|---|---|
| 1 | PDU_1 | O_1 | 2009-08-11T16:10:00 | DOWN |
| 2 | PDU_1 | O_1 | 2009-08-11T17:03:00 | UP |
| ... | ... | ... | ... | ... |
| ... | PDU_1 | O_2 | 2009-08-11T16:10:00 | UP |
| ... | PDU_1 | O_2 | | UP |
| ... | PDU_1 | O_2 | | DOWN |
| ... | ... | ... | ... | ... |
| ... | PDU_3 | ... | ... | ... |
| ... | ... | ... | ... | ... |

| 1401 | 1402 | 1403 | 1404 | 1405 | 1406 | 1407 |
|---|---|---|---|---|---|---|
| PDU_ID | Outlet_ID | Change_Type | Change_Time | Event_Type | Device_Type | Device_ID |
| PDU_1 | O_1 | UP | 2009-08-11T17:52:00 | A | Server | Server_1 |
| | | | | B | Server | Server_2 |
| | | | ... | ... | ... | ... |
| | | | 2009-08-11T22:49:00 | A | Server | Server_1 |
| | | DOWN | | C | Switch | Switch_1 |
| | | | ... | ... | ... | ... |
| | | | 2009-08-11T19:22:00 | A | Server | Server_2 |
| | | | 2009-08-11T21:33:00 | D | Server | Server_1 |
| | | | | D | Server | Server_1 |
| | | | | E | Storage | Storage_1 |
| | | | ... | ... | ... | ... |
| ... | O_2 | ... | ... | ... | ... | ... |
| PDU_5 | O_2 | UP | ... | F | Storage | Storage_2 |
| ... | ... | ... | ... | ... | ... | ... |
| PDU_8 | O_4 | UP | ... | F | Storage | Storage_3 |
| ... | ... | ... | ... | ... | ... | ... |

*FIG. 14*

METHOD AND APPARATUS FOR DISCOVERY AND DETECTION OF RELATIONSHIP BETWEEN DEVICE AND POWER DISTRIBUTION OUTLET

BACKGROUND OF THE INVENTION

The present invention relates generally to power consumption management and, more particularly, to the discovery and detection of the relationship between a power consuming device and power distribution outlets.

An intelligent PDU (Power Distribution Unit) has emerged in recent years as an apparatus which has a LAN interface for providing management information to and facilitating control by a management system so that the management system can remotely power ON/OFF each outlet of the PDU. In order to achieve Green IT (Green Information Technology for, e.g., reducing power consumption), monitoring and metering power consumption of each power consuming device will be important and such intelligent PDU will be very useful to perform those functions. What is more, monitoring the usage of each outlet is important for detecting and preventing too much power consumption for any given PDU or rack, and is necessary for optimizing power capacity planning in a server room, a data center, or the like.

The management system of a PDU has management information such as the relationship between an outlet and a device to which the outlet supplies power. Currently, such relationship information is set manually by an operator/administrator or it can be set by importing data with a CSV (Comma Separated Values) file. However, it will be very burdensome work for an operator/administrator to set the mapping (relationship) information for each pair of an outlet and a device, especially in cases where the number of devices is very large; furthermore, to make a CSV file would also be burdensome. In addition, a device may be connected to an outlet which is different from the outlet defined in the set mapping (relationship) information. If that occurs, there is no way to detect the error under the current approaches. Moreover, human error may result in the connection of a device to an unused outlet with no authorization, which may cause problems such as excessive power consumption for the PDU or power supply. Such errors should be detected to avoid problems, but it is difficult to do so under the current approaches.

BRIEF SUMMARY OF THE INVENTION

Exemplary embodiments of the invention provide a method and an apparatus for the discovery and detection of the relationships between power consuming devices and power distribution outlets, in order to obtain the mapping (relationship) information for each pair of an outlet and a device to which the outlet supplies power. Embodiments of the invention further facilitate the detection of any existence of a pair of an outlet and a device which seems to be different from the set mapping (relationship) information, the detection of any change of device-outlet connection, and the detection of any unknown or unauthorized device connection to the PDU.

An aspect of the present invention is directed to a system including at least one power consuming device and a plurality of outlets for supplying power, and a method for discovering a relationship between a target device of the at least one power consuming device and at least one outlet of the plurality of outlets which supplies power to the target device. The method comprises applying an external action to the target device to change power consumption of the target device; monitoring power consumption at each of the plurality of outlets; and correlating the applied external action and the monitored power consumption to obtain the relationship between the target device and the at least one outlet which supplies power to the target device.

In some embodiments, the system comprises a plurality of devices which include a server, a storage device, and one or a plurality of switches coupled to the server and the storage device. Applying an external action to the target device comprises at least one of making CPU usage of the server high and low to change the power consumption of the server; making storage I/O to the storage device via one switch high and low to change the power consumption of the storage device and the one switch; changing network path setting between the server and the storage device via the switches to change the power consumption of the switches; changing a fan speed of a fan of the server or turning fan power of the fan of the server on/off to change the power consumption of the server; turning CPU clock capping on/off for the server to change the power consumption of the server; making disk or RAID group spin up/down for the storage device to change the power consumption of the storage device; turning power saving mode on/off for one switch of the plurality of switches to change the power consumption of the one switch; turning power on/off for the target device of the plurality of devices to change the power consumption of the target device; turning power on/off for the target device of the plurality of devices to change the power consumption of the target device; turning power on/off for the server; turning redundant fan power on/off for the server; turning redundant switch power on/off for the at least one switch; or turning redundant controller power on/off for the storage device.

In specific embodiments, the system comprises a plurality of devices which include a server, a storage device, and one or a plurality of switches coupled to the server and the storage device. The method further comprises applying a server CPU load to the server to make CPU usage high and low repeatedly and periodically. The method further comprises, for each path between the server and the storage device via one or more of the switches, applying an I/O load to cause the server to issue I/O to the storage device and make a number of I/O per unit time high and low repeatedly and periodically. The target device is the server, and the correlating comprises performing a correlation analysis between the CPU load of the server and the power consumption of the plurality of outlets during a server phase which begins at a start of applying the server CPU load and terminates at an end of applying the server CPU load; and based on the correlation analysis, obtaining the relationship between the server and one or more of the outlets which supply power to the server. The method further comprises performing a correlation analysis between the I/O load to the storage device and the power consumption of the plurality of outlets during an I/O phase which begins at a start of applying the I/O load and terminates at an end of applying the I/O load; and based on the correlation analysis, obtaining the relationship between the storage device and one or more of the outlets which supply power to the storage device. The method further comprises, for each switch, performing a correlation analysis between the I/O load to the switch and the power consumption of the plurality of outlets during an I/O phase which begins at a start of applying the I/O load and terminates at an end of applying the I/O load; and based on the correlation analysis, obtaining the relationship between the switch and one or more of the outlets which supply power to the switch. The method further comprises, for each switch of the one or plurality of switches, applying storage read I/O for random data to the switch and storage device; applying storage read I/O for consistent same data to the switch and storage device; performing a correlation analysis between I/O load of the storage read I/O to the switch and the storage device and the power consumptions of the plurality of outlets; and based on the correlation analysis, obtaining the relationship between the switch and one or more of the outlets which supply power to the switch and obtaining the relationship between the storage device and one or more of the outlets which supply power to the storage device by using a situation that the I/O load to the switch has positive correlation with the power consumption of the one or more outlets. The external action comprises causing a power saving function in the target device to change the power consumption of the target device.

Another aspect of the invention is directed to a system including at least one power consuming device and a plurality of outlets for supplying power, and a method for discovering a relationship between a target device of the at least one power consuming device and at least one outlet of the plurality of outlets which supplies power to the target device. The method comprises observing events occurring in the target device; identifying one or more of the observed events that match a predefined event type affecting power consumption of the target device; monitoring power consumption at each of the plurality of outlets; and correlating the identified events matching the predefined event type and the monitored power consumption to obtain the relationship between the target device and the at least one outlet which supplies power to the target device.

In some embodiments, the predefined event type comprises a power saving function. The correlating comprises matching the one or more time points at which the one or more identified events occur with the one or more power consumption changing points at which one or more changes in the monitored power consumption occur to within a predefined time duration tolerance. The method further comprises counting a number of the matching for each of the outlets and the target device; and identifying one or more of the outlets having the highest counted numbers of the matching as being the at least one outlet which supplies power to the target device.

Another aspect of the invention is directed to a system including at least one power consuming device and a plurality of outlets for supplying power, and a method for discovering a relationship between a target device of the at least one power consuming device and at least one outlet of the plurality of outlets which supplies power to the target device. The method comprises observing events occurring in the target device; identifying one or more of the observed events; monitoring power consumption at each of the plurality of outlets; and correlating the identified events and the monitored power consumption to obtain the relationship between the target device and the at least one outlet which supplies power to the target device.

In some embodiments, the correlating comprises matching the one or more time points at which the one or more identified events with the one or more power consumption changing points at which one or more changes in the monitored power consumption occur to within a predefined time duration tolerance. The method further comprises, for each outlet, counting a number of first instances for the devices on which some same events happened at the time points where power consumption on the outlet increased, the counting identifying a first device having a highest counted number of first instances; counting a number of second instances for the devices on which some same events happened at the time points where power consumption on the outlet decreased, the counting identifying a second device having a highest counted number of second instances; and if the first device is the same as the second device, identifying the same device as being the target device which is supplied power by the outlet.

In some embodiments, the method further comprises applying an external action to the target device to change the power consumption of the target device. The method further comprises causing a power saving function in the target device to change the power consumption of the target device.

These and other features and advantages of the present invention will become apparent to those of ordinary skill in the art in view of the following detailed description of the specific embodiments.

BRIEF DESCRIPTION OF THE DRAWINGS

FIG. 2 illustrates an example of a Load Generator Log Table of FIG. 1.

FIG. 3 illustrates an example of a PDU/Outlet Power Consumption Log Table.

FIG. 4 illustrates an example of a Device-Outlet Relationship Table.

FIG. 5 illustrates an example of a Device List Table.

FIG. 6 illustrates an example of a Topology Table.

FIG. 10 illustrates an example of a Power Saving Function Related Event Definition Table of FIG. 16.

FIG. 11 illustrates an example of a Power Changing Point Temp Table of FIG. 16.

FIG. 14 illustrates an example of a Power Consumption Related Event Detection Temp Table 1400 of FIG. 17.

DETAILED DESCRIPTION OF THE INVENTION

Figure 1:
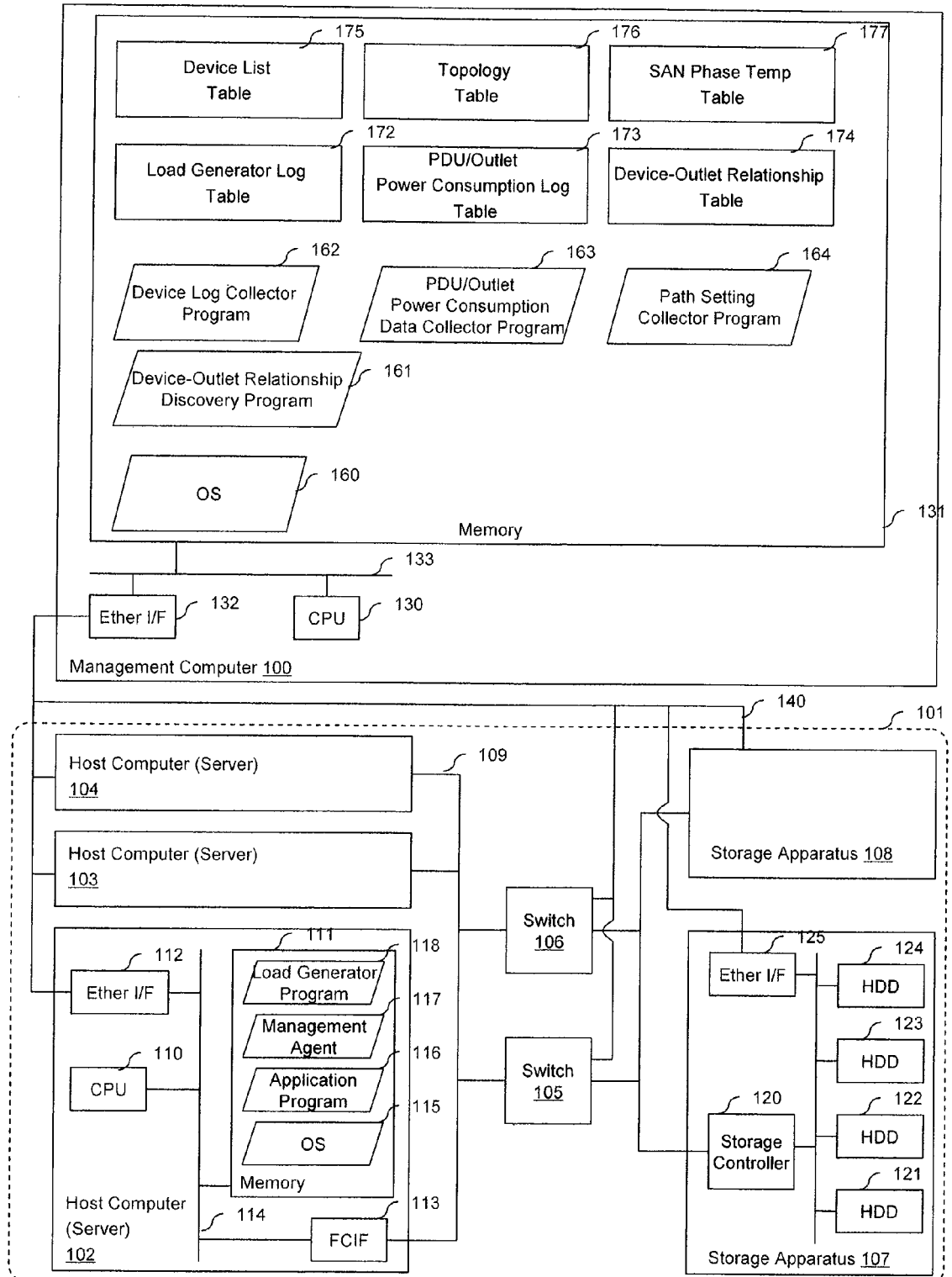
FIG. 1 illustrates an example of a hardware configuration of an information system in which the method and apparatus of the invention may be applied, including a management computer according to a first embodiment of the present invention.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for the discovery and detection of the relationships between power consuming devices and power distribution outlets, in order to obtain the mapping (relationship) information for each pair of an outlet and a device to which the outlet supplies power.

In general, the power consumption of a device is dependent on the load on the device to some extent. For example, the power consumption of a server (computer) is largely dependent on the CPU (processor) usage. In the case of a storage apparatus, power consumption is also dependent on the processor load (I/O processing load) in the storage controller. It also depends on HDD (Hard Disk Drive) rotations, which may be stopped when access is terminated. The power consumption of a network switch can be controlled according to network traffic. There are other examples where power consumption is dependent upon or controlled based on the load on the device. In US 2009/0006876 A1, a method is disclosed whereby the power consumption of a storage apparatus can be changed based on storage access.

In a first embodiment of the invention, external action is applied to each of one or more managed devices to change its power consumption (e.g., it increases). The power consumption by the PDU (Power Distribution Unit) is monitored. This leads to the discovery and detection of the relationship between each device and the outlet which supplies power to the device. This approach can be used in an environment where a plurality of power consuming devices are connected with each other through a data network such as a SAN (Storage Area Network).

In a second embodiment of the invention, events of a predefined event type associated with each of one or more power consuming devices is observed. The log information about those events on each device and the power consumption of each device is obtained. Based on the log information, the discovery and detection of the relationship between each device and the outlet which supplies power to the device is achieved. This is done by matching those event happening points with power consumption changing time points.

In a third embodiment of the invention, there is no need to define event types, to prepare a predefined event type, or to observe a predefined event type. Instead, the log information on each device and the power consumption of each device is obtained. Based on the log information, the discovery and detection of the relationship between each device and the outlet which supplies power to the device is achieved. This is done by finding a specific event type occurring on a specific device around the power consumption changing time points for each outlet.

In a fourth embodiment of the invention, a request for a power saving related function to a target device externally from the management computer is used to change the power consumption on the device.

1. FIRST EMBODIMENT

1.1. System Configuration

FIG. 1 illustrates an example of a hardware configuration of an information system in which the method and apparatus of the invention may be applied, including a management computer according to a first embodiment of the present invention. The information system includes a managed system or device 101 and a management computer 100.

The managed system 101 includes host computers 102, 103, and 104, switches 105 and 106, and storage apparatuses 107 and 108, and these devices are connected via a data network 109. The data network 109 in this embodiment is a Fiber Channel. However other networks, such as Ethernet, can be used. In this example, a Fiber Channel switch 105 is used for connecting the host computers 102, 103, and 104 and the storage apparatuses 107 and 108 to each other. FIG. 1 shows the details for only one host computer 102 and one storage apparatus 107. The host computer 102 and the storage apparatus 107 have at least one Fiber Channel interface board (FCIF). The switch 105 has a management interface through which the management computer 100 can get certain management information about the switch 105 and can also execute certain management tasks on the switch 105.

The host computer 102 is a generic computer that comprises a CPU 110, a memory 111, an Ethernet interface 112, and an FCIF 113. These elements are connected through a system bus 114. The operating system (OS) 115 runs on the managed host computer 102. The application program 116 may run on the OS 115. Files and data for the OS 115 and the application program 116 are stored in data volumes, which are provided by the storage apparatus 107. The OS 115 and the application program 116 issue write and/or read commands to the storage apparatus 107. The management agent program 117 may run on the OS 115, through which the management computer 100 can get certain management information about the host computer 102 and can also execute certain management tasks on the host computer 102. The Load Generator Program 118 may run on the OS 115, and is used for a Device-Outlet Relationship Discovery Process in this invention.

The storage apparatus 107 has one or more storage controllers 120 and one or more hard disk drives (HDD) 121, 122, 123, and 124. The storage apparatus 107 provides a management interface 125, which is an Ethernet interface in this example, through which the management computer 100 can get certain management information about the storage apparatus 107 and can also execute certain management tasks on the storage apparatus 107.

The management computer 100 is a generic computer that comprises a CPU 130, a memory 131, and an Ethernet interface 132. The elements are connected through a system bus 133. The management computer 100 manages the managed system 101 through the management network 140. The management computer 100 has an OS 160, a Device-Outlet Relationship Discovery Program 161, a Device Log Collector Program 162, a PDU/Outlet Power Consumption Data Collector Program 163, and a Path Setting Collector Program 164 in its memory 131. These programs are executed by CPU 130. The management computer 100 further includes a Load Generator Log Table 172, a PDU/Outlet Power Consumption Log Table 173, a Device-Outlet Relationship Table 174, a Device List Table 175, a Topology Table 176, and a SAN Phase Temp Table 177.

1.2. Load Generator Log Table

FIG. 2 illustrates an example of a Load Generator Log Table 200 which corresponds to the same table 172 of FIG. 1. The table contains the columns of ID 201, Time 202, and Event 203. The ID 201 is a unique number assigned to each log record in this table. The Time 202 is a timestamp of each log record (event) that happened. The Event 203 is information about what event happened. This table is generated by the Load Generator Program 118 in FIG. 1.

1.3. PDU/Outlet Power Consumption Log Table

FIG. 3 illustrates an example of a PDU/Outlet Power Consumption Log Table 300 which corresponds to the same table 163 of FIG. 1. The table contains the columns of ID 301, Time 302, PDU_ID 303, Outlet_ID 304, and Power_Consumption 305. The ID 301 is a unique number assigned to each log record in this table. The Time 302 is a timestamp of each log record. The PDU_ID 303 is a unique identifier assigned to each PDU. The Outlet_ID 304 is a unique identifier assigned to each outlet in each PDU. The Power_Consumption 305 is metric data which indicates how much power each outlet consumed at that timestamp. It may be represented as W (watt), A (ampere), VA (Volt Ampere), or the like. These data are collected by the PDU/Outlet Data Collector Program 163 in FIG. 1 from each managed PDU, and registered into this table. Data collection may be done by polling from the PDU/Outlet Data Collector Program 163 to each PDU, or it may be done by receiving notifications from each PDU to the PDU/Outlet Data Collector Program 163. The data collection may be done periodically, on event, on demand, or the like. In this example, this single table is for all PDUs; however, it is also possible to provide one table per each PDU.

1.4. Device-Outlet Relationship Table

FIG. 4 illustrates an example of a Device-Outlet Relationship Table 400 which corresponds to the same table 174 of FIG. 1. The table contains the columns of PDU_ID 401, Outlet_ID 402, Device_ID 403, and Registered_Time 404. The PDU_ID 401 is a unique identifier assigned to each PDU. The Outlet_ID 402 is a unique identifier assigned to each outlet in each PDU. The Device_ID 403 is a unique identifier assigned to each device. The Registered_Time 404 is a timestamp of each record registered. These data are registered by the Device-Outlet Relationship Discovery Program 161 in this invention.

In the existing PDU management products, this kind of mapping (relationship) information has to be set by human manually. According to this invention, this mapping (relationship) information does not have to be set manually. In the case where a human operator/administrator registers this information by hand, this invention can also be used to help him/her to notice if a situation arises where some information is different from the real/actual Device-Outlet connection. For example, some warning message can be shown or notified to the operator/administrator whenever the system detects a wrong configuration.

1.5. Device List Table

FIG. 5 illustrates an example of a Device List Table 500 which corresponds to the same table 175 of FIG. 1. The table contains the columns of Device_ID 501, Device_Type 502, and Outlet_Mapping 504. The Device_ID 501 is a unique identifier assigned to each device. The Device_Type 502 is the type of the managed device such as Server, Switch, Storage, PDU, etc. The Outlet_Mapping 504 is a true/false flag which indicates whether an outlet which supplies power to the device has already been mapped (associated) with the device. FIG. 5 shows a list of managed devices that are managed by the management system. It includes PDUs which do not receive power from a PDU, and hence the Outlet_Mapping is Null.

1.6. Topology Table

FIG. 6 illustrates an example of a Topology Table 600 which corresponds to the same table 176 of FIG. 1. The table contains the columns of ID 601, Server 602, Switch 603, and Storage 604. The ID 601 is a unique number assigned to each record in this table. The Server 602 is a Device_ID for representing a server node. The Switch 603 is a Device_ID for representing a switch node. The Storage 604 is a Device_ID for representing a storage node. These data are collected by the Path Setting Collector Program 164 in FIG. 1 from the managed servers (host computers), managed switches, and managed storage apparatuses. For example, a host computer (server) has iSCSI (Internet Small Computer System Interface) setting information such as IP address or Fiber Channel HBA (Host Bus Adapter) setting information such as WWN (World Wide Name) and so on. A storage apparatus has iSCSI setting information as well or Fiber Channel Port information. A switch has route information, fabric information or zoning information and so on. The Path Setting Collector Program 164 accesses the management interfaces provided by managed nodes, obtains this setting information, and generates this Topology Table 600.

1.7. SAN Phase Temp Table

Figure 7:
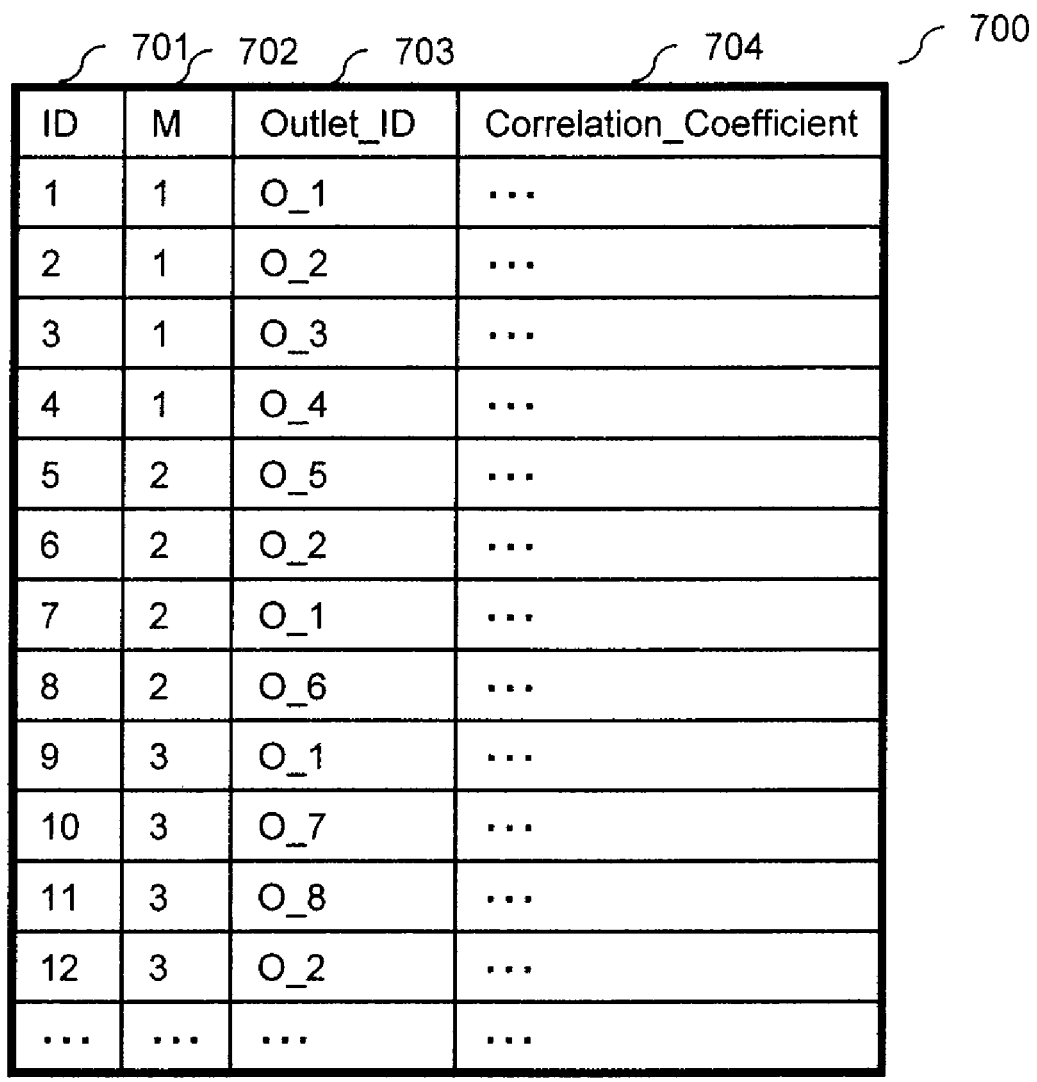
FIG. 7 illustrates an example of a SAN Phase Temp Table of FIG. 1.

FIG. 7 illustrates an example of a SAN Phase Temp Table 700 which corresponds to the same table 177 of FIG. 1. The table contains the columns of ID 701, M 702, Outlet_ID 703, and Correlation_Coefficient 704. The ID 701 is a unique number assigned to each record in this table. The M 702 is a value for the variable M in the Active Device-Outlet Relationship Discovery Process of the first embodiment (see FIG. 8). The Outlet_ID 703 is a unique identifier assigned to each outlet in each PDU. The Correlation_Coefficient 704 is a correlation coefficient calculated based on correlation analysis. The correlation coefficient theoretically ranges from −1 to +1, with −1 being completely out-of-phase and +1 being completely in-phase. Correlation analysis techniques are known in the art (see FIG. 9 and discussion below). This table is a temporary table used for determining outlets for devices such as switches and storage apparatuses.

1.8. Flowchart for Active Device-Outlet Relationship Discovery Process

Figure 8:
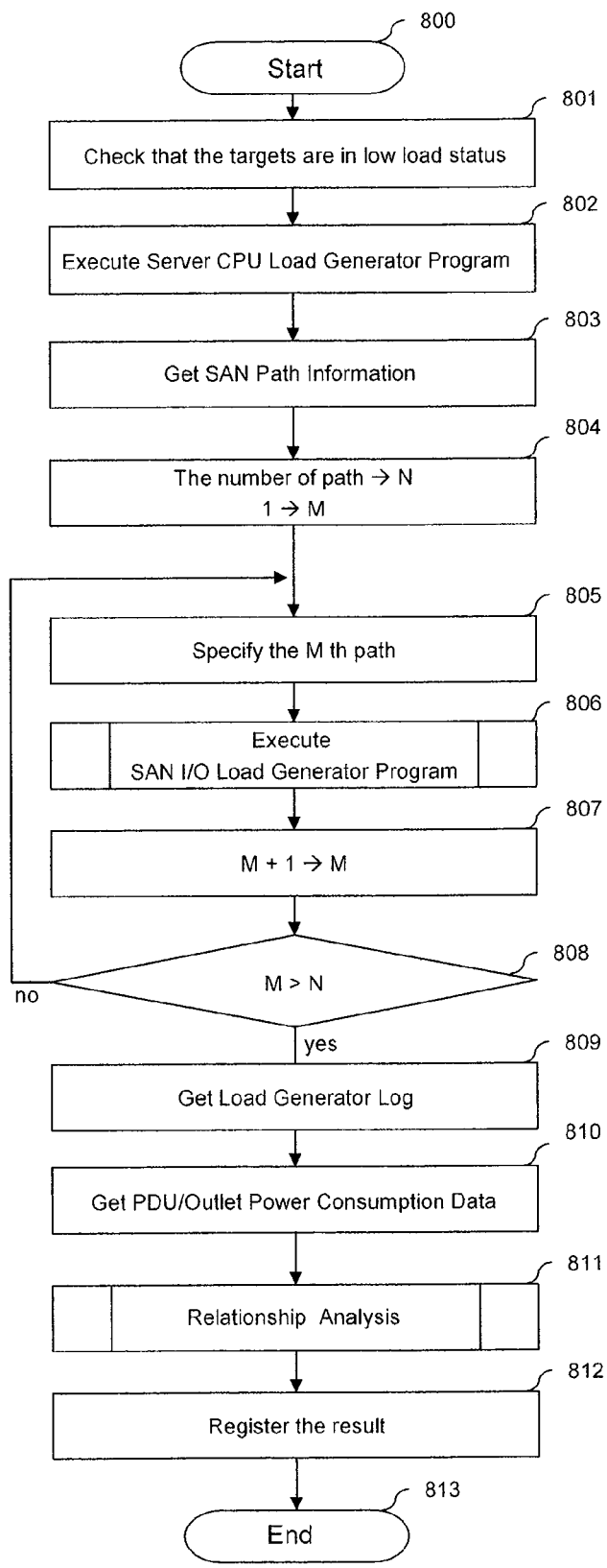
FIG. 8 illustrates an exemplary flow diagram of a Device-Outlet Relationship Discovery Program according to the first embodiment.

FIG. 8 illustrates an exemplary flow diagram of a Device-Outlet Relationship Discovery Program 161 according to the first embodiment. In step 800, the process starts with being given target information (e.g., one server (host computer), one storage apparatus, and one or more switches between them). In step 801, the program checks that the given targets are all in low load status. A target is in low load status if the load is substantially lower than the normal or average load; this can be specified by the administrator (e.g., a low load is less than about 50% of the normal or average load). This can be done in several ways. For example, the management computer can get the performance information of the targets through the management interface exposed by each target (OS on the managed server, managed switch, or managed storage apparatus). In step 802, the process executes a Server CPU Load Generator Program which may be a part of the Load Generator Program 118 in FIG. 1. The Server CPU Load Generator Program may run on the target server or may run on some other computer. The Server CPU Load Generator Program is designed for making CPU usage high and low repeatedly and periodically. It writes its working log information to the Load Generator Log Table 172 in FIG. 1 (see example in FIG. 2). In step 803, the program gets the SAN Path Information from the Topology Table 176 of FIG. 1 (see example in FIG. 6).

In step 804, the program counts the number of possible paths between the target server and the target storage. The number of possible paths is set to N. The program initially sets the variable M to 1, where M is the current number of the path. In step 805, the program specifies the Mth path (which is initially 1 and then is increased incrementally). In step 806, the process executes a SAN I/O Load Generator Program which may be a part of the Load Generator Program 118 in FIG. 1. The SAN I/O Load Generator Program may run on the target server or may run on some other computer. The SAN I/O Load Generator Program is designed for causing the server to issue I/O to the target storage apparatus (which is a Sub-Process) (see FIG. 18). In step 807, the program increments the variable M by 1 to the M+1th path. In step 808, if M is bigger than N, then the program proceeds to step 809; otherwise, it goes back to step 805.

In step 809, the program gets the log information from the Load Generator Log Table 172 (see example in FIG. 2). In step 810, the program gets data from the PDU/Outlet Power Consumption Log Table 173 of FIG. 1 (see example in FIG. 3). In step 811, the program performs a Relationship Analysis (which is a Sub-Process) (see FIG. 9). In step 812, the program registers the result to the Device-Outlet Relationship Table 174 of FIG. 1 (see example in FIG. 4). The process ends at step 813.

1.9. Flowchart for Execute SAN I/O Load Generator Program

Figure 18:
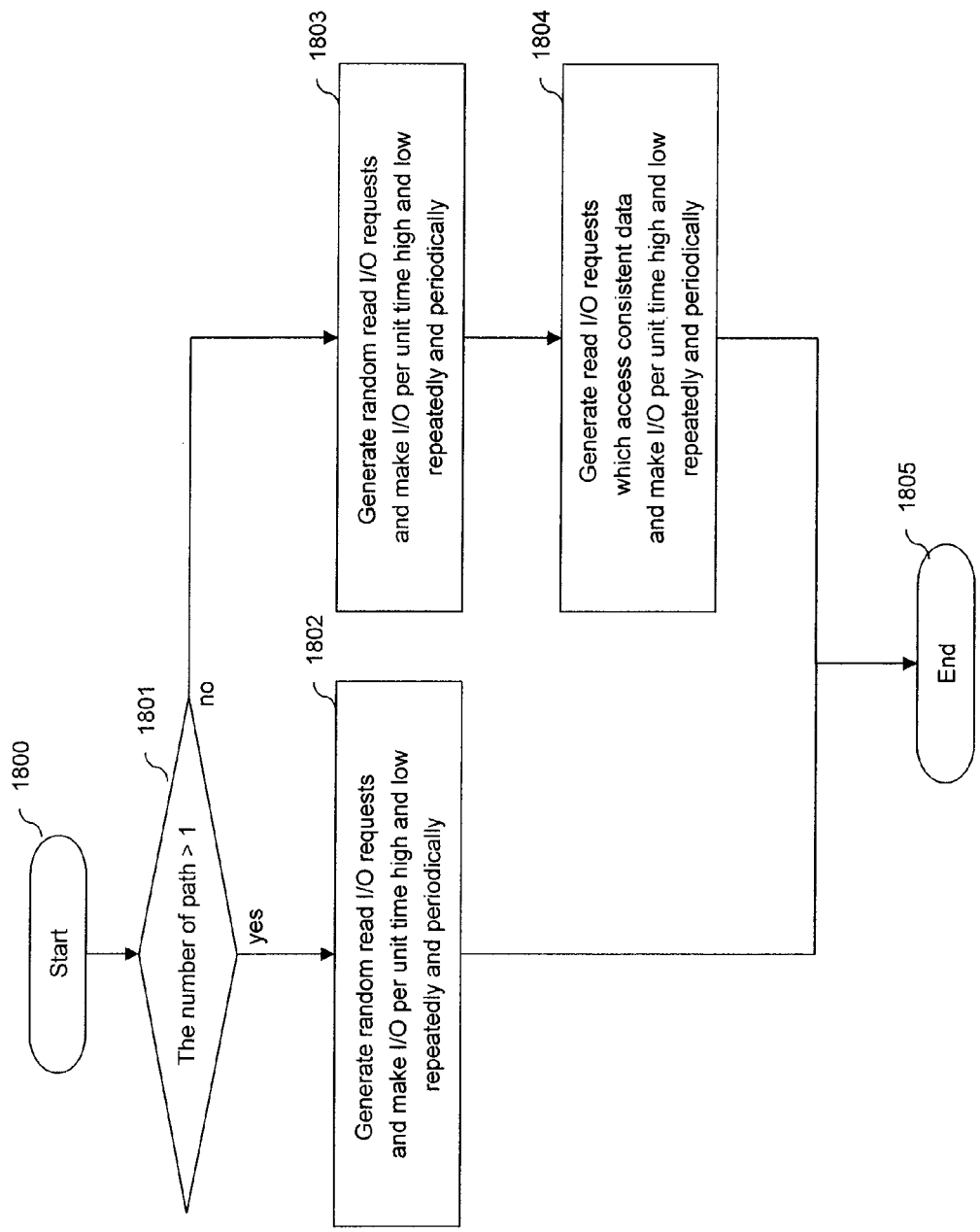
FIG. 18 illustrates an exemplary flow diagram of the Execute SAN I/O Load Generator Program as a Sub-Process of FIG. 8.

FIG. 18 illustrates an exemplary flow diagram of the Execute SAN I/O Load Generator Program (which is a Sub-Process of the Device-Outlet Relationship Discovery Program 161)) mentioned in step 806 in FIG. 8. The process starts at step 1800. In step 1801, if the number of the path is bigger than 1, then the program generates random read I/O and makes the number of I/O per unit time high and low repeatedly and periodically (step 1802). If the number of the path is not bigger than 1, then the program generates random read I/O and makes the number of I/O per unit time high and low repeatedly and periodically (step 1803). Then in step 1804, it generates read I/O requests which access consistent data (same target data) and make I/O per unit time high and low repeatedly and periodically, which means that it consume less power than step 1803 (random I/O). Because consistent data access makes the storage apparatus use cache instead of directly accessing the disk, the storage apparatus can execute Spin Down (MAID) functionality. The program ends at step 1803. It writes its working log information to the Load Generator Log Table 172 (see example in FIG. 2).

1.10. Flowchart for Relationship Analysis Sub-Process

Figure 9:
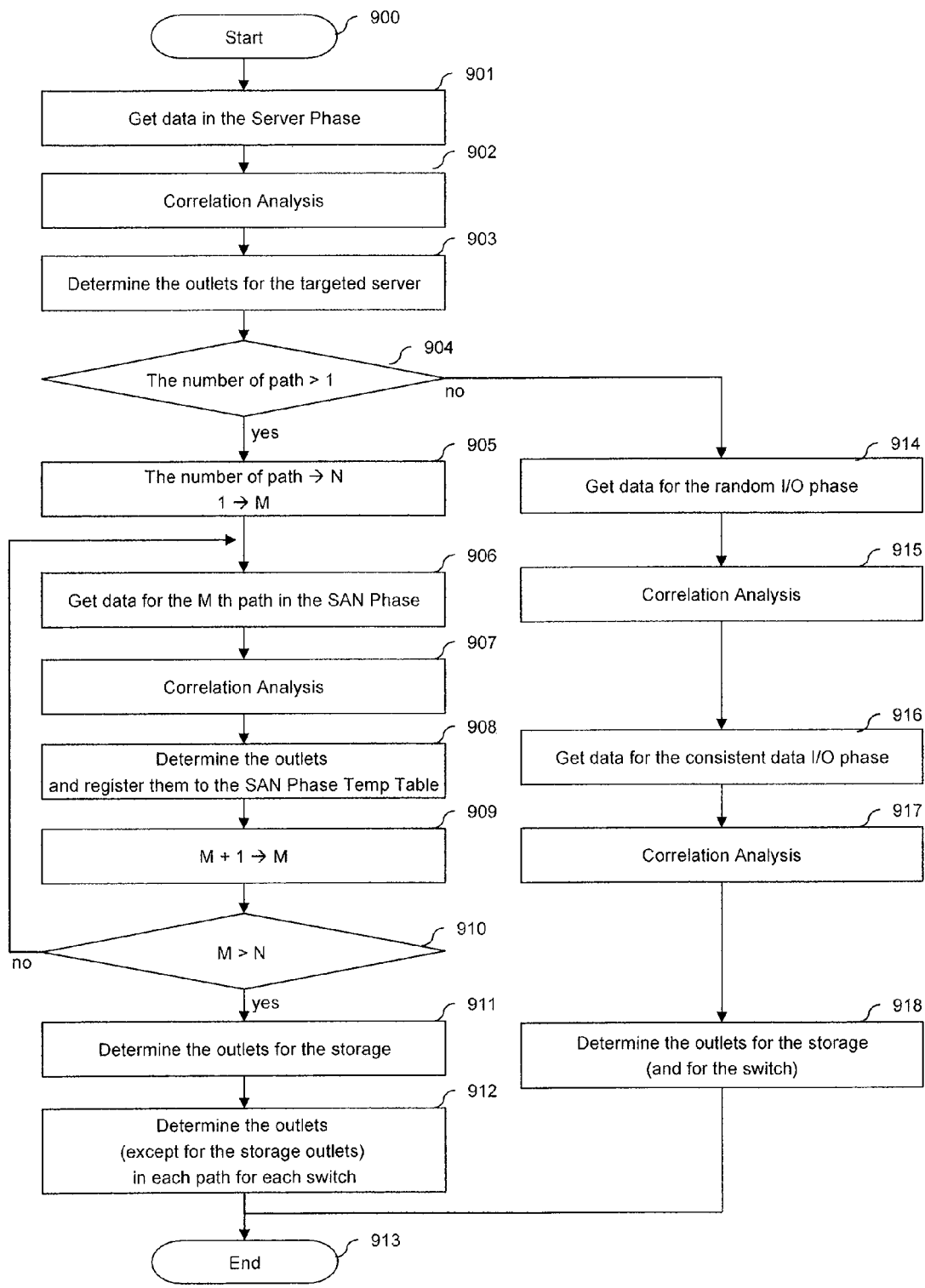
FIG. 9 illustrates an exemplary flow diagram of the Relationship Analysis (Sub-Process) in FIG. 8.

FIG. 9 illustrates an exemplary flow diagram of the Relationship Analysis (which is a Sub-Process of the Device-Outlet Relationship Discovery Program 161) mentioned in step 811 of FIG. 8. The process starts at step 900. In step 901, the program gets data in the "Server Phase" from the Load Generator Log Table 172 (see example in FIG. 2). Here the "Server Phase" means that the duration between the point at which the Server CPU Load Generator Program started and the point at which it ended. In step 902, the program performs a Correlation Analysis. The correlation analysis is the general way to understand the strength between two variables. A correlation coefficient theoretically ranges from −1 to +1, with −1 being completely out-of-phase and +1 being completely in-phase. There are several methods to perform a correlation analysis. One example uses the Pearson's product-moment coefficient. Any suitable method can be used in this invention. In step 903, the program determines the outlets for the target server based on the correlation analysis. For example, the outlet of which correlation coefficient is the biggest is chosen. In a general information system, one server is supplied power by multiple PDUs for redundancy. Here multiple outlets may be chosen for the target server.

In step 904, if the number of path is bigger than 1, then the program proceeds to step 905; otherwise, it proceeds to step 914.

In step 905, the program sets the number of paths to N, and sets the variable M initially to 1. In step 906, the program gets data for the Mth path in the "SAN Phase." Here the "SAN Phase" (or "Network I/O Phase") means the duration between the point at which the SAN I/O Load Generator Program started and the point at which it ended. In step 907, the program performs another Correlation Analysis for the SAN Phase (which is similar to step 902 for the Server Phase). In step 908, the program determines the outlets based on the correlation analysis and registers them to the SAN Phase Temp Table 177 of FIG. 1 (see example in FIG. 7). In step 909, the program increments the variable M by 1 to the M+1th path. In step 910, if M is bigger than N, then the program proceeds to step 911; otherwise, it goes back to step 906.

In step 911, the program determines the outlets for the target storage apparatus. The power consumption of the outlets which supply power to the target storage apparatus must have been independent from each Mth step because it has not been affected by path. The outlets for the target storage apparatus can be determined based on this premise. In step 912, the program determines the outlets for each target switch. In each Mth step, there are several outlets chosen based on the correlation analysis. The outlets for the target storage apparatus must be chosen in all steps. Therefore, the chosen outlets except for the outlets for the storage (as determined in step 911) as well as the outlet for the server are determined for each target switch in each step. The program ends at step 913.

If the number of path is not bigger than 1 at step 904, in step 914, the program gets data for the "random I/O phase." Here the "random I/O phase" means the duration between the point at which the SAN I/O Load Generator Program started to execute random read I/O (mentioned in step 1803 in FIG. 18) and the point at which it ends. In step 915, the program performs a Correlation Analysis.

In step 916, the program gets data for the "consistent data I/O phase." Here the "consistent data I/O phase" means the duration between the point at which the SAN I/O Load Generator Program started to execute consistent data read I/O (mentioned in step 1804 in FIG. 18) and the point at which it ends. In step 917, the program performs a Correlation Analysis.

In step 918, the program determines the outlets for the target storage apparatus and switch. The power consumption of the storage apparatus in the "consistent data I/O phase" is expected to be lower than that in the "random I/O phase"; therefore it can determine which outlet supplies power to the storage apparatus by comparing power consumption in those phases. It also determines the outlet for the switch because the outlet for the storage apparatus has been already determined. In other words, it can determine which outlet supplies power to the switch because power consumption of the switch has positive correlation with both of two types of read I/O (random and consistent) and consequently it can determine the outlet for the storage apparatus. The program ends at step 913.

2. SECOND EMBODIMENT

In the second embodiment, a Device-Outlet Relationship Discovery Process is achieved without using a Load Generator Program. Only the differences from the first embodiment are described. In this embodiment, certain event types related to power saving functions are used for discovering the relationship between device and outlet. Servers, switches, and storage apparatuses sometimes have Power Saving functions such as less power mode or power-off mode, etc. When those functions work, power consumption of those devices will decrease. Device-Outlet Relationship Discovery is achieved by matching those event happening points with power consumption changing points.

Figure 16:
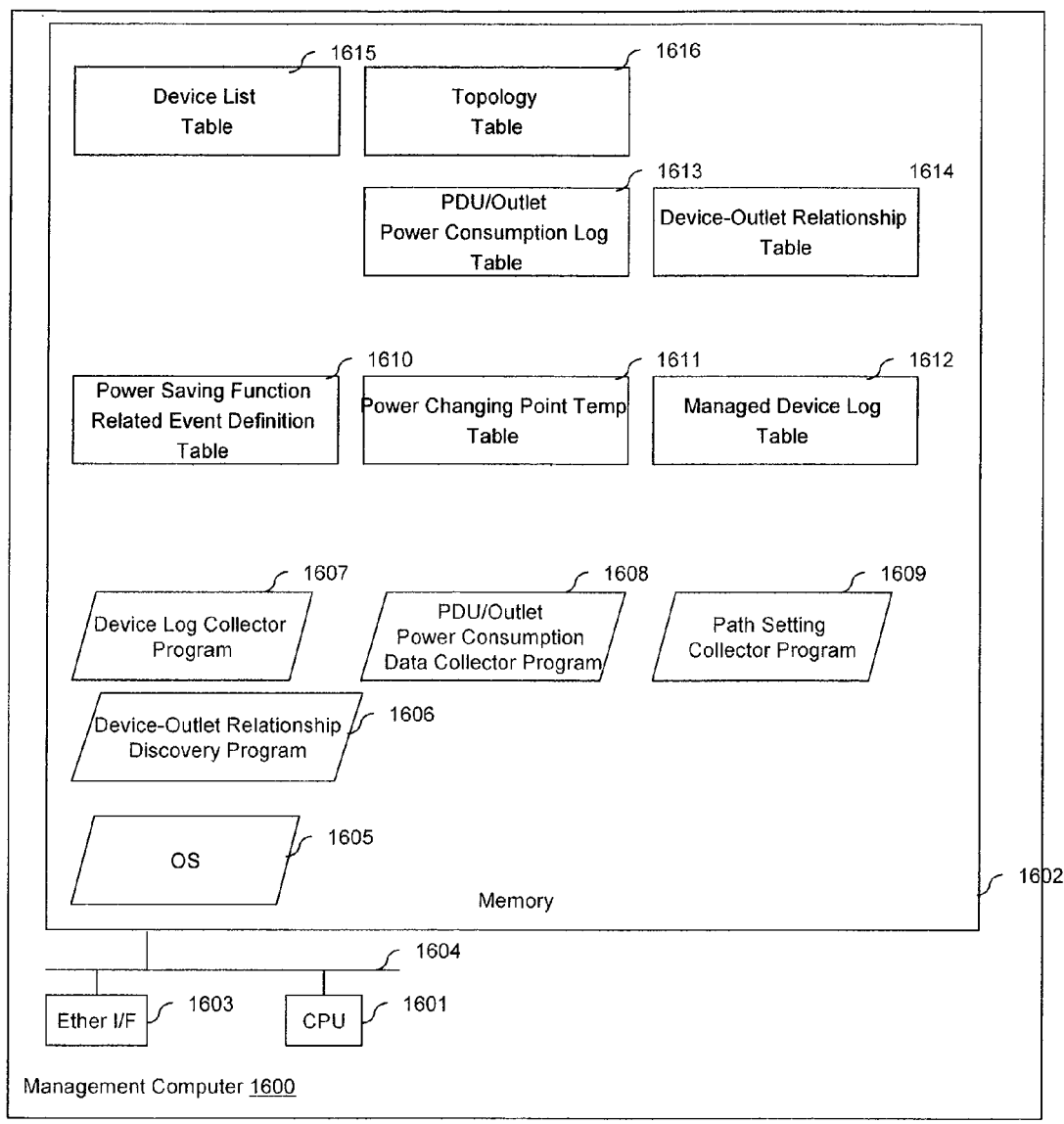
FIG. 16 illustrates an example of the management computer according to a second embodiment of the present invention.

FIG. 16 illustrates an example of the management computer 1600 according to the second embodiment. The management computer 1600 contains the following similar features as in FIG. 1: a CPU 1601, a memory 1602, an Ethernet interface 1603, a system bus 1604, an OS 1605, a Device-Outlet Relationship Discovery Program 1606, a Device Log Collector Program 1607, a PDU/Outlet Power Consumption Data Collector Program 1608, a Path Setting Collector Program 1609, a PDU/Outlet Power Consumption Log Table 1613, a Device-Outlet Relationship Table 1614, a Device List Table 1615, and a Topology Table 1616. It does not need the Load Generator Log Table 172 and SAN Phase Temp Table 177 of FIG. 1. It contains the following new features: a Power Saving Function Related Event Definition Table 1610, a Power Changing Point Temp Table 1611, and a Managed Device Log Table 1612.

2.1. Power Saving Function Related Event Definition Table

FIG. 10 illustrates an example of a Power Saving Function Related Event Definition Table 1000 which corresponds to the same table 1610 of FIG. 16. The table contains the columns of ID 1001, Event_Type 1002, Device_Type 1003, and Change_Type 1004. The ID 1001 is a unique number assigned to each record in this table. The Event_Type 1002 represents the event type related to the Power Saving function, which affects power consumption on a device. Each event type represents a distinguishable event from other events. The same event type means the same situation. The value of the Event_Type may be strings which can be distinguished from others or may be event ID which is a unique number representing each distinguishable situation. In the FIG. 10, strings are used for the Event_Type. The Device_ID 1003 is a unique identifier assigned to each device. The Change_Type 1004 indicates whether the power consumption increases or decreases when the event happens. It is represented as "UP" or "DOWN." In this embodiment, this table is supposed to be configured by a human operator/administrator manually.

2.2. Power Changing Point Temp Table

FIG. 11 illustrates an example of a Power Changing Point Temp Table 1100 which corresponds to the same table 1611 of FIG. 16. The table contains the columns of ID 1101, PDU_ID 1102, Outlet_ID 1103, Time 1104, and Change_Type 1105. The ID 1101 is a unique number assigned to each record in this table. The PDU_ID 1102 is a unique identifier assigned to each PDU. The Outlet_ID 1103 is a unique identifier assigned to each outlet in each PDU. The Time 1104 is a time which represents the point in time when the power consumption seems to have increased or decreased. The Change_Type 1004 indicates whether the power consumption increased or decreased. It is represented as "UP" or "DOWN." This is a temporary table used for specifying the time duration for the target event type.

2.3. Managed Device Loci Table

Figure 12:
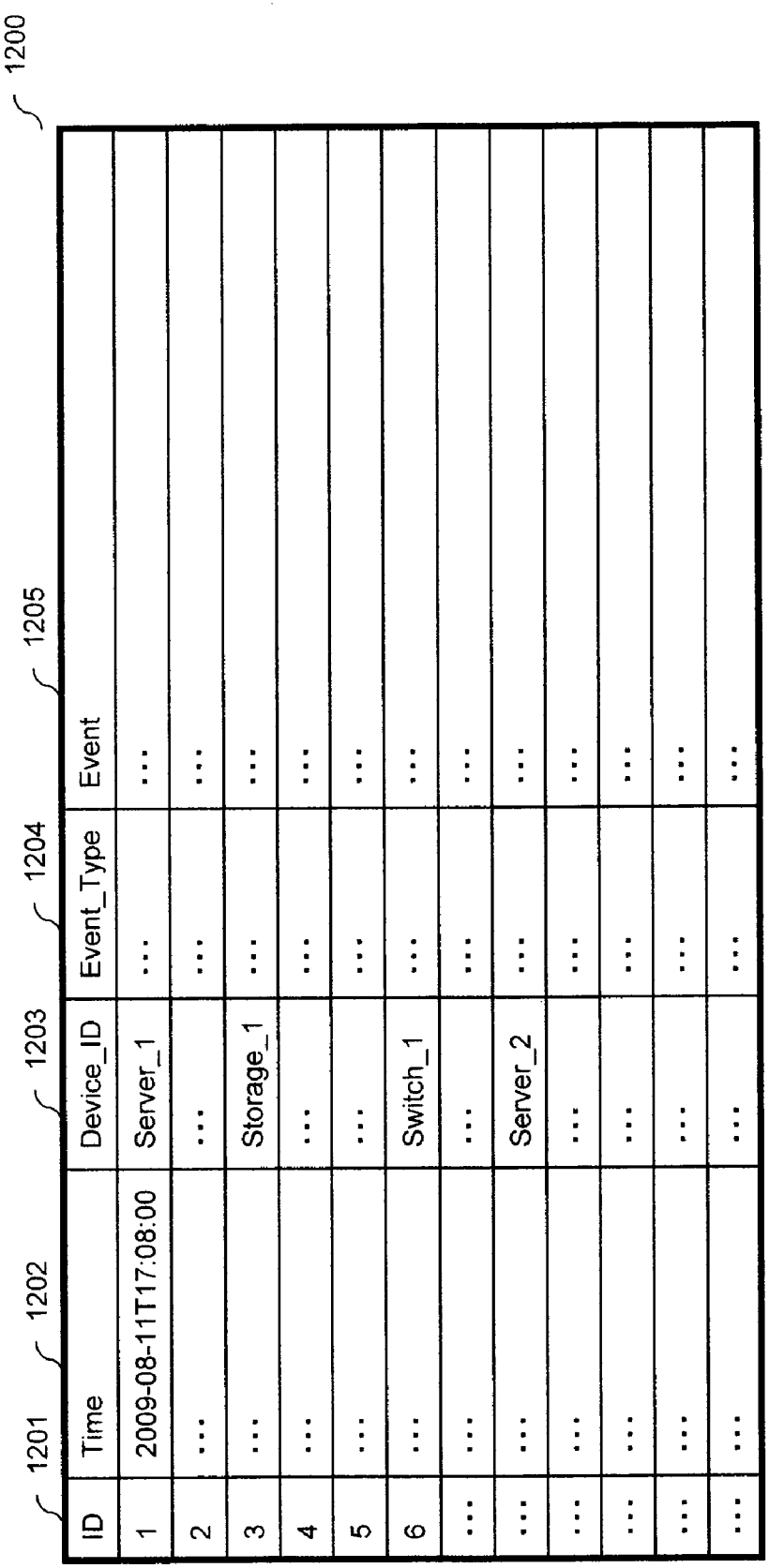
FIG. 12 illustrates an example of a Managed Device Log Table of FIG. 16.

FIG. 12 illustrates an example of a Managed Device Log Table 1200 which corresponds to the same table 1612 of FIG. 16. The table contains the columns of ID 1201, Time 1202, Device_ID 1203, Event_Type 1204, and Event 1205. The ID 1201 is a unique number assigned to each log record in this table. The Time 1202 is a timestamp of each log record (event) that happened. The Device_ID 1203 is a unique identifier assigned to each device in which this event happened. The Event_Type 1204 represents the event type of this event. As discussed above, each event type represents a distinguishable event from other events, and the value of the Event_Type may be strings or may be event ID. The Event 1205 is information about what event happened. The Event 1205 may be human readable text. This log information is collected by the Device Log Collector Program 1607 of FIG. 16 from each managed device and registered into this table. Log collection may be done by polling from the Device Log Collector Program 1607 to each device or it may be done by receiving notifications from each device to the Device Log Collector Program 1607. It may be done periodically, on event, or on demand, etc. In this example, this single table is for all managed devices; however, it is also possible to provide one table per each device.

Figure 13:
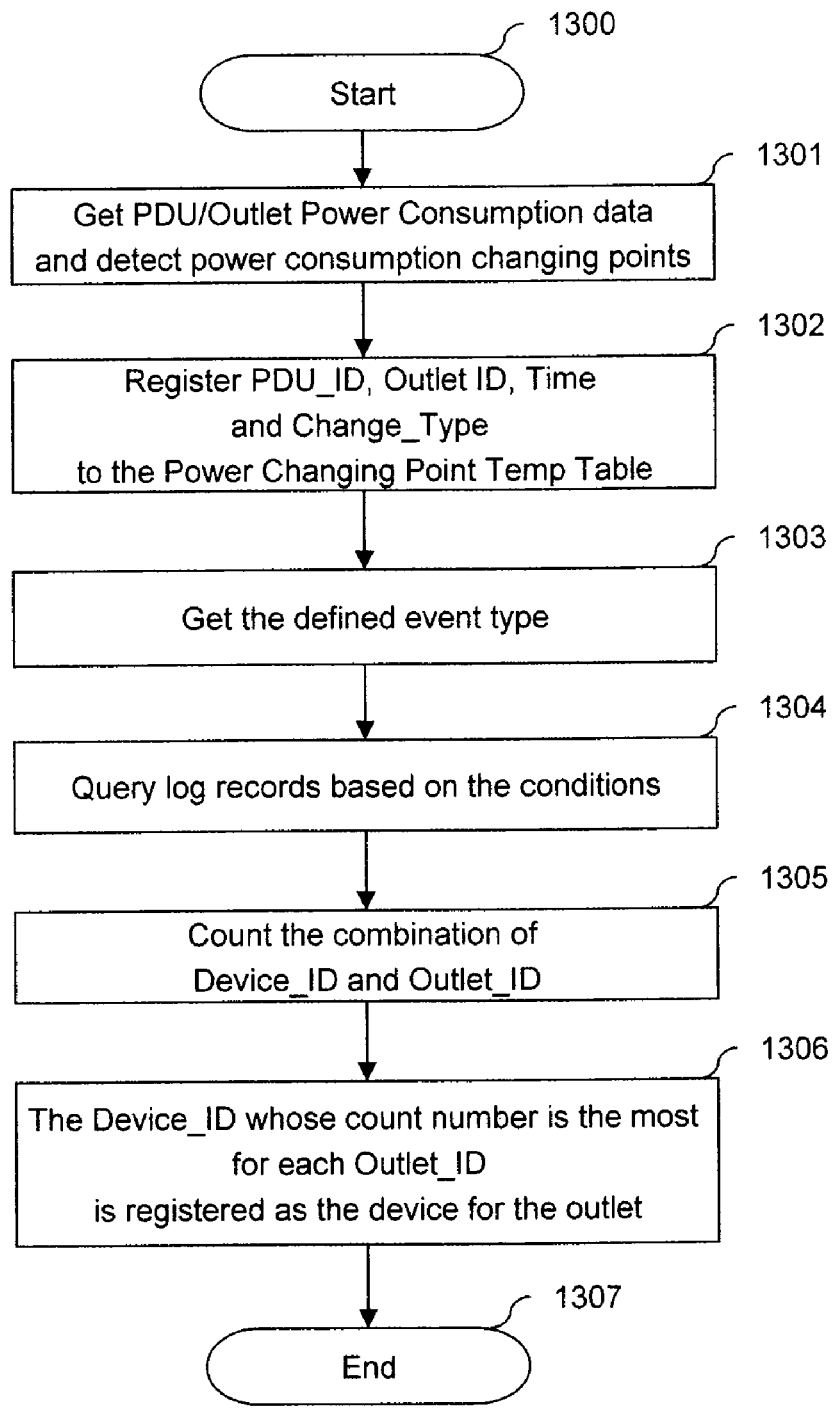
FIG. 13 illustrates an exemplary flow diagram of the Device-Outlet Relationship Discovery Program according to the second embodiment.

2.4. Flowchart for Device-Outlet Relationship Discovery Process without Load Generator Program FIG. 13 illustrates an exemplary flow diagram of the Device-Outlet Relationship Discovery Program 1606 according to the second embodiment. The difference from the first embodiment is that the second embodiment does not use the Load Generator Program 118 of FIG. 1.

The program starts at step 1300. In step 1301, the program gets data from the PDU/Outlet Power Consumption Log Table 1613 of FIG. 16 (see example in FIG. 3) and detects the power consumption changing points. In step 1302, the program registers the PDU_ID, Outlet_ID, Time, and Change_Type into the Power Changing Point Temp Table 1611 of FIG. 16 (see example in FIG. 11). In step 1303, the program gets the defined event type from the Power Saving Function Related Event Definition Table 1610 of FIG. 16 (see example in FIG. 10). In step 1304, the program queries records from the Managed Device Log Table 1612 of FIG. 16 (see example in FIG. 12) using the Power Changing Point Temp Table 1611 and the Power Saving Function Related Event Definition Table 1610 with the following conditions:

[Time in the Power Changing Point Temp Table]−$T$<
[Time in the Managed Device Log Table]<Time
in the Power Changing Point Temp Table]+$T$. (1)

[Event_Type in the Managed Device Log Table]=
[Event_Type in the Power Saving Function
Related Event Definition Table]. (2)

[Change_Type in the Power Changing Point Temp
Table]=[Change_Type in the Power Saving Function Related Event Definition Table]. (3)

Here T is a time duration tolerance, which may be set by initial configuration, for example. Typically, T is a small duration that is sufficient to identify legitimate correlations but not so large as to include improper ones.

In step 1305, the program counts the combination of Device_ID and Outlet_ID in the result of the previous step 1304. In step 1306, the Device_ID of which count number is the most for each Outlet_ID is registered as the device for the outlet into the Device-Outlet Relationship Table 1614 of FIG. 16 (see example in FIG. 4). The program ends at step 1307.

3. THIRD EMBODIMENT

In the third embodiment, a Device-Outlet Relationship Discovery Process is performed without a Load Generator Program and without a Predefined Event Type. Only the differences from the second embodiment are described. Without using a predefined event type, the Device-Outlet Relationship Discovery is achieved by finding a specific event type happening on a specific device around the power consumption changing time points for each outlet.

Figure 17:
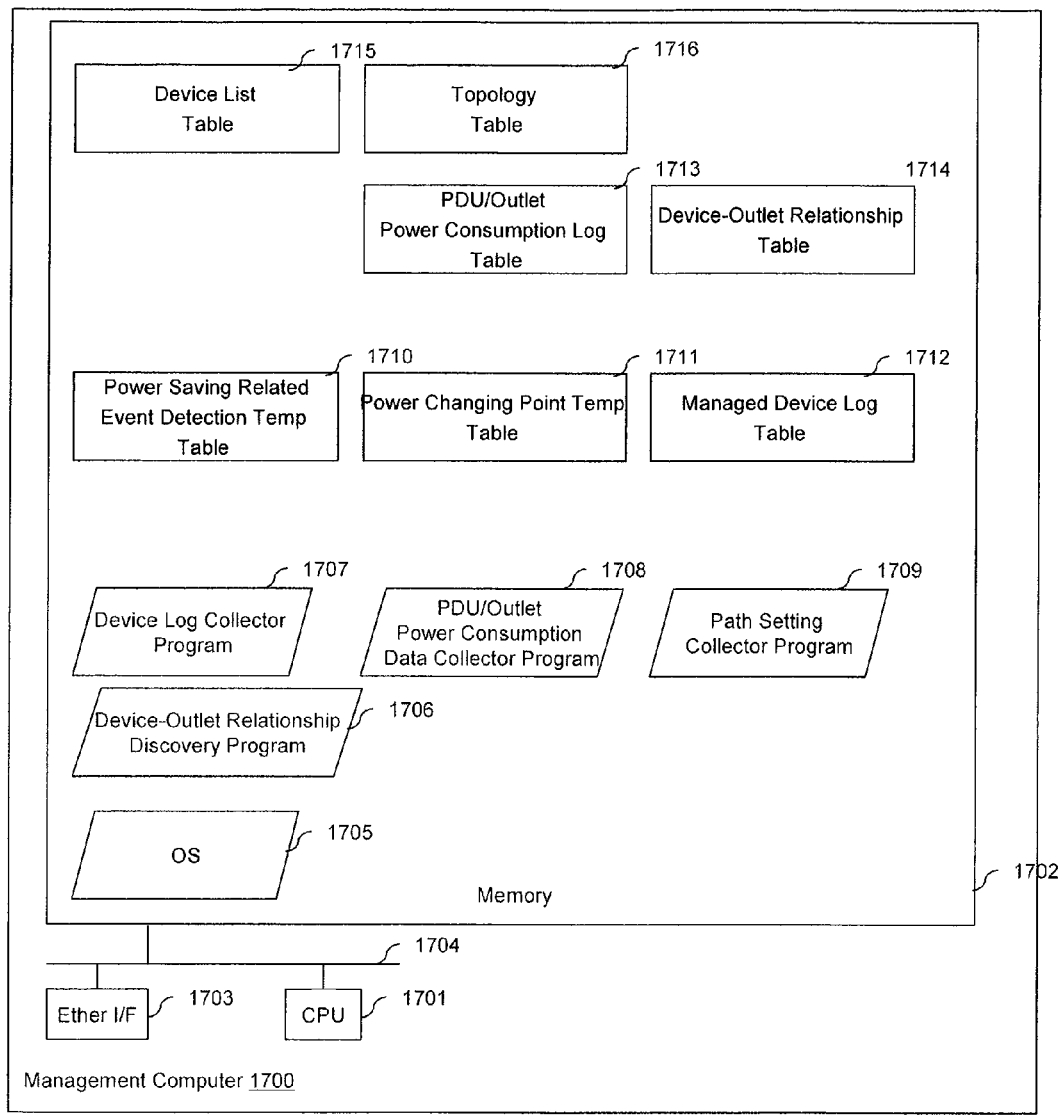
FIG. 17 illustrates an example of the management computer according to a third embodiment of the present invention.

FIG. 17 illustrates an example of the management computer 1700 according to the third embodiment. The management computer 1700 contains the following similar features as in FIG. 16: a CPU 1701, a memory 1702, an Ethernet interface 1703, a system bus 1704, an OS 1705, a Device-Outlet Relationship Discovery Program 1706, a Device Log Collector Program 1707, a PDU/Outlet Power Consumption Data Collector Program 1708, a Path Setting Collector Program 1709, a Power Changing Point Temp Table 1711, a Managed Device Log Table 1712, a PDU/Outlet Power Consumption Log Table 1713, a Device-Outlet Relationship Table 1714, a Device List Table 1715, and a Topology Table 1716. It does not need the Power Saving Function Related Event Definition Table 1610. Instead, it contains a Power Consumption Related Event Detection Temp Table 1710.

3.1. Power Consumption Related Event Detection Temp Table

FIG. 14 illustrates an example of a Power Consumption Related Event Detection Temp Table 1400 which corresponds to the same table 1710 of FIG. 17. The table contains the columns of PDU_ID 1401, Outlet_ID 1402, Change_Type 1403, Change_Time 1404, Event_Type 1405, Device_Type 1406, and Device_ID 1407. The PDU_ID 1401 is a unique identifier assigned to each PDU. The Outlet_ID 1402 is a unique identifier assigned to each outlet in each PDU. The Change_Type 1403 indicates whether the power consumption increased or decreased. It is represented as "UP" or "DOWN." The Change_Time 1404 represents the point in time when the power consumption seems to have increased or decreased. The Event_Type 1405 represents the type of the event which happened in the device. As discussed above, each event type represents a distinguishable event from other events, and the value of the Event_Type may be strings or may be event ID. The Device_Type 1406 is the type of the managed device such as Server, Switch or Storage in this case. The Device_ID 1407 is a unique identifier assigned to each device, which represents the device where the event happened. This is a temporary table used for specifying events related to power consumption in the Device-Outlet Relationship Discovery Process without Predefined Event Type (see FIG. 15).

Figure 15:
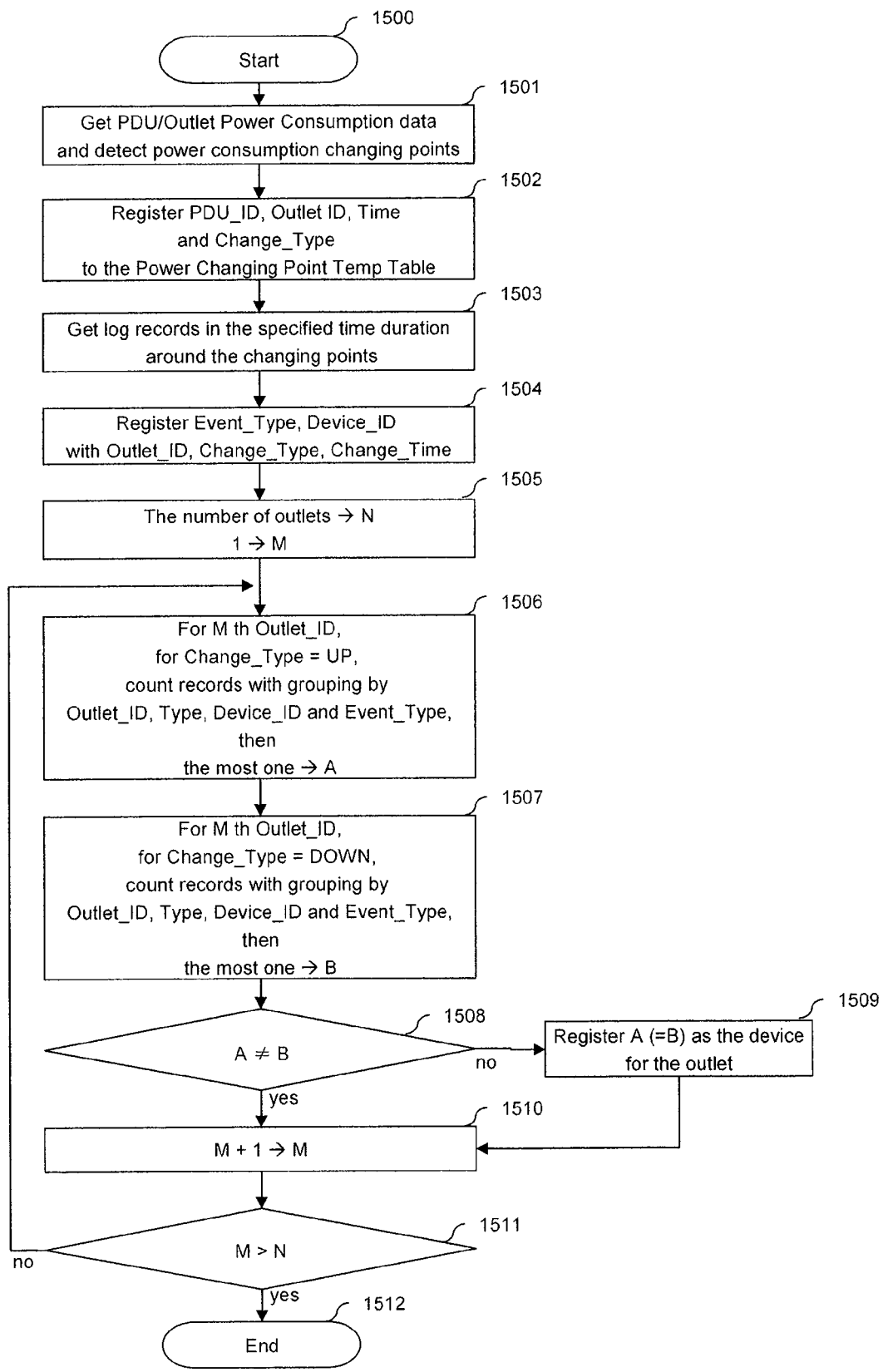
FIG. 15 illustrates an exemplary flow diagram of the Device-Outlet Relationship Discovery Program according to the third embodiment.

3.2. Flowchart for Device-Outlet Relationship Discovery Process without Predefined Event Type FIG. 15 illustrates an exemplary flow diagram of the Device-Outlet Relationship Discovery Program 1706 according to the third embodiment. The difference from the second embodiment is that this does not use the Power Saving Function Related Event Definition Table 1601 in the second embodiment (see FIGS. 10 and 16).

The program starts at step 1500. In step 1501, the program gets data from the PDU/Outlet Power Consumption Log Table 1713 of FIG. 17 (see example in FIG. 3) and detects the power consumption changing points. In step 1502, the program registers the PDU_ID, Outlet_ID, Time, and Change_Type into the Power Changing Point Temp Table 1711 of FIG. 17 (see example in FIG. 11). In step 1503, the program gets the log records in the specified time duration around the changing points from the Managed Device Log Table 1712 of FIG. 17 (see example in FIG. 12) using the Power Changing Point Temp Table 1711. It is queried with the following condition:

[Time in the Power Changing Point Temp Table]−$T$<
[Time in the Managed Device Log Table]<Time
in the Power Changing Point Temp Table]+$T$ In step 1504, the program registers the Event_Type, Device_ID without duplication with Outlet_ID, Change_Type, and Change_Time into the Power Consumption Related Event Detection Temp Table 1710 of FIG. 17 (see example in FIG. 14). In step 1505, the program counts the number of outlets without duplication in the Power Consumption Related Event Detection Temp Table 1710 and sets the number to the number N. The program sets the initial value of the variable M to 1. In step 1506, with reference to the Power Consumption Related Event Detection Temp Table 1710, for the Mth Outlet_ID, for Change_Type=UP, the program counts the records with grouping by Outlet_ID, Change_Type, Device_ID and Event_Type, and then sets the Device_ID of the most one (highest count) to the variable A. In step 1507, with reference to the Power Consumption Related Event Detection Temp Table 1710, for the Mth Outlet_ID, for Change_Type=DOWN, the program counts the records with grouping by Outlet_ID, Type, Device_ID and Event_Type, and then sets the Device_ID of the most one (highest count) is set to the variable B.

In step 1508, if A does not equal B, then the program proceeds to step 1510; otherwise, it goes to step 1509. In step 1509, the program registers the Device_ID represented as A (=B) with the Outlet_ID to the Device-Outlet Relationship Table 174 (see example in FIG. 4). In step 1510, the program increments the variable M by 1 to M+1. In step 1511, if M is bigger than N, then the program ends at step 1512; otherwise, it goes back to step 1506.

4. FOURTH EMBODIMENT

In the fourth embodiment, a Device-Outlet Relationship Discovery Process is performed without a Load Generator Program. Only the differences from the first embodiment are described. In this embodiment, external action is not used to cause a load increase/decrease in order to change the power consumption. Instead, a request for a power saving related function to a target device externally from the management computer is used in order to change the power consumption on the device. Examples of such power saving related functions for a Server (Host Computer) include Host Power On/Off (e.g., in case of server virtualization, host computer is powered off when virtual servers on the host are migrated to another host computer), CPU Clock Capping On/Off, Redundant Fan Power On/Off, Change Fun Speed. Examples of power saving related functions for a Switch include Power Saving Mode On/Off and Redundant Switch Power On/Off. Examples of power saving related functions for a Storage Apparatus include Disk (RAID Group) Spin Down/Up (MAID (Massive Arrays of Inactive Disks)) and Redundant Controller Power On/Off.

Of course, the system configurations illustrated in FIGS. 1, 16, and 17 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for the discovery and detection of the relationship between a power consuming device and power distribution outlets. Additionally, while specific embodiments have been illustrated and described in this specification, those of ordinary skill in the art appreciate that any arrangement that is calculated to achieve the same purpose may be substituted for the specific embodiments disclosed.

This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. In a system including at least one power consuming device and a plurality of outlets for supplying power, a method for discovering a relationship between a target device of the at least one power consuming device and at least one outlet of the plurality of outlets which supplies power to the target device, the method comprising:
    applying an external action to the target device to change power consumption of the target device;
    monitoring power consumption at each of the plurality of outlets; and
    correlating the applied external action and the monitored power consumption to obtain the relationship between the target device and the at least one outlet which supplies power to the target device.

2. A method according to claim 1, wherein the system comprises a plurality of devices which include a server, a storage device, and one or a plurality of switches coupled to the server and the storage device, and wherein applying an external action to the target device comprises at least one of:
    making CPU usage of the server high and low to change the power consumption of the server;
    making storage I/O to the storage device via one switch high and low to change the power consumption of the storage device and the one switch;
    changing network path setting between the server and the storage device via the switches to change the power consumption of the switches;
    changing a fan speed of a fan of the server or turning fan power of the fan of the server on/off to change the power consumption of the server;
    turning CPU clock capping on/off for the server to change the power consumption of the server;
    making disk or RAID group spin up/down for the storage device to change the power consumption of the storage device;
    turning power saving mode on/off for one switch of the plurality of switches to change the power consumption of the one switch;
    turning power on/off for the target device of the plurality of devices to change the power consumption of the target device;
    turning power on/off for the target device of the plurality of devices to change the power consumption of the target device;
    turning power on/off for the server;
    turning redundant fan power on/off for the server;
    turning redundant switch power on/off for the at least one switch; or
    turning redundant controller power on/off for the storage device.

3. A method according to claim 1, wherein the system comprises a plurality of devices which include a server, a storage device, and one or a plurality of switches coupled to the server and the storage device.

4. A method according to claim 3, further comprising:
    applying a server CPU load to the server to make CPU usage high and low repeatedly and periodically.

5. A method according to claim 4, further comprising:
    for each path between the server and the storage device via one or more of the switches, applying an I/O load to cause the server to issue I/O to the storage device and make a number of I/O per unit time high and low repeatedly and periodically.

6. A method according to claim 5, wherein the target device is the server, and wherein the correlating comprises:
    performing a correlation analysis between the CPU load of the server and the power consumption of the plurality of outlets during a server phase which begins at a start of applying the server CPU load and terminates at an end of applying the server CPU load; and
    based on the correlation analysis, obtaining the relationship of CPU load and power consumption between the server and one or more of the outlets which supply power to the server.

7. A method according to claim 5, further comprising:
    performing a correlation analysis between the I/O load to the storage device and the power consumption of the plurality of outlets during an I/O phase which begins at a start of applying the I/O load and terminates at an end of applying the I/O load; and
    based on the correlation analysis, obtaining the relationship of I/O load and power consumption between the storage device and one or more of the outlets which supply power to the storage device.

8. A method according to claim 5, further comprising:
    for each switch, performing a correlation analysis between the I/O load to the switch and the power consumption of the plurality of outlets during an I/O phase which begins at a start of applying the I/O load and terminates at an end of applying the I/O load; and
    based on the correlation analysis, obtaining the relationship of I/O load and power consumption between the switch and one or more of the outlets which supply power to the switch.

9. A method according to claim 3 further comprising, for each switch of the one or plurality of switches:
    applying storage read I/O for random data to the switch and storage device;
    applying storage read I/O for consistent same data to the switch and storage device;
    performing a correlation analysis between I/O load of the storage read I/O to the switch and the storage device and the power consumptions of the plurality of outlets; and
    based on the correlation analysis, obtaining the relationship of I/O load and power consumptions between the switch and one or more of the outlets which supply power to the switch and obtaining the relationship of I/O load and power consumptions between the storage device and one or more of the outlets which supply power to the storage device by using a situation that the I/O load to the switch has positive correlation with the power consumption of the one or more outlets.

10. A method according to claim 1, wherein the external action comprises causing a power saving function in the target device to change the power consumption of the target device.

11. In a system including at least one power consuming device and a plurality of outlets for supplying power, a method for discovering a relationship between a target device of the at least one power consuming device and at least one outlet of the plurality of outlets which supplies power to the target device, the method comprising:

observing events occurring in the target device;
identifying one or more of the observed events that match a predefined event type affecting power consumption of the target device;
monitoring power consumption at each of the plurality of outlets; and
correlating the identified events matching the predefined event type and the monitored power consumption to obtain the relationship between the target device and the at least one outlet which supplies power to the target device.

12. A method according to claim 11, wherein the predefined event type comprises a power saving function.

13. A method according to claim 11, wherein the correlating comprises matching one or more time points at which the one or more identified events occur with the one or more power consumption changing points at which one or more changes in the monitored power consumption occur to within a predefined time duration tolerance.

14. A method according to claim 13, further comprising:
counting a number of the matching for each of the outlets and the target device; and
identifying one or more of the outlets having the highest counted numbers of the matching as being the at least one outlet which supplies power to the target device.

15. In a system including at least one power consuming device and a plurality of outlets for supplying power, a method for discovering a relationship between a target device of the at least one power consuming device and at least one outlet of the plurality of outlets which supplies power to the target device, the method comprising:
observing events occurring in the target device;
identifying one or more of the observed events;
monitoring power consumption at each of the plurality of outlets; and
correlating the identified events and the monitored power consumption to obtain the relationship between the target device and the at least one outlet which supplies power to the target device.

16. A method according to claim 15, wherein the correlating comprises matching one or more time points at which the one or more identified events with the one or more power consumption changing points at which one or more changes in the monitored power consumption occur to within a predefined time duration tolerance.

17. A method according to claim 15, further comprising, for each outlet:
counting a number of first instances for the devices on which some same events happened at time points where power consumption on the outlet increased, the counting identifying a first device having a highest counted number of first instances;
counting a number of second instances for the devices on which some same events happened at the time points where power consumption on the outlet decreased, the counting identifying a second device having a highest counted number of second instances; and
if the first device is the same as the second device, identifying the same device as being the target device which is supplied power by the outlet.

18. A method according to claim 15, further comprising, applying an external action to the target device to change the power consumption of the target device.

19. A method according to claim 15, further comprising:
causing a power saving function in the target device to change the power consumption of the target device.

20. A method according to claim 9, further comprising:
based on the correlation analysis, determining which outlet supplies power to the switch because power consumption of the switch has positive correlation with both storage read I/O for random data and storage read I/O for consistent same data and consequently determining which outlet supplies power to the storage device.

* * * * *